3,003,929
AZEOTROPIC DISTILLATION WITH BY-PASSING OF REFLUX OR VAPOR
Albert G. Bright, Rochester, N.Y., assignor to Eastman Kodak Company, Rochester, N.Y., a corporation of New Jersey
Filed Sept. 30, 1959, Ser. No. 843,440
2 Claims. (Cl. 202—40)

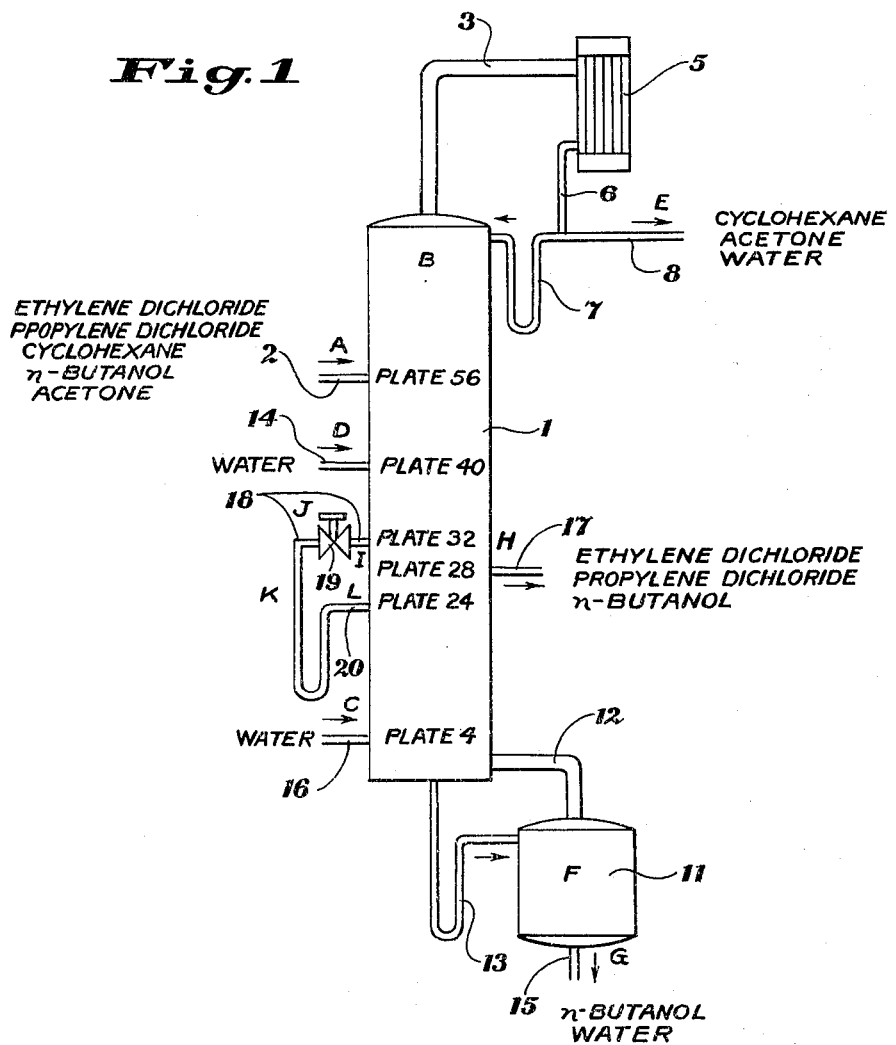

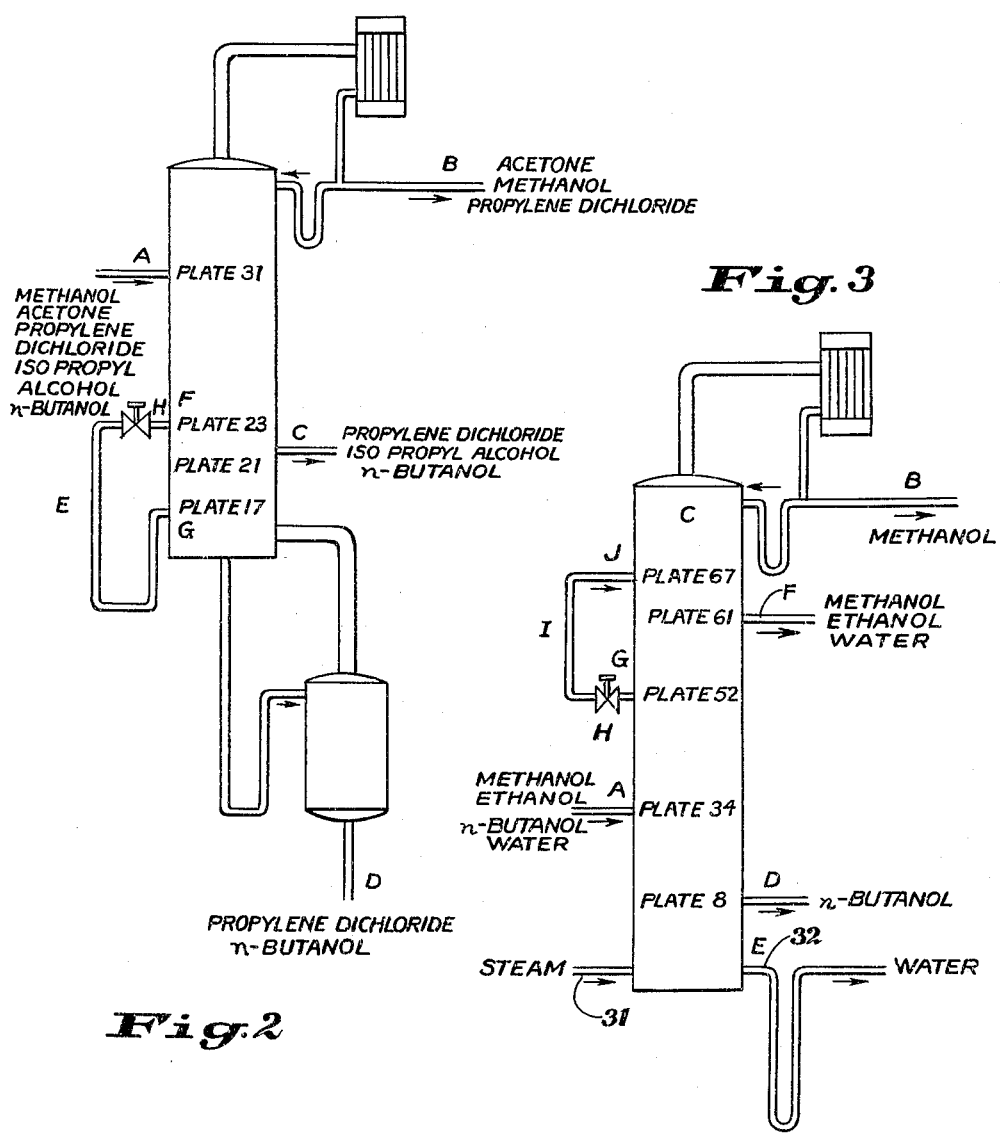

This invention relates to the separation of solvent mixtures by distillation. More particularly this invention concerns the fractionation of solvent mixtures which contain halogenated hydrocarbons, ketones, cyclohexane and the like by distillation procedure involving azeotropic distillation. In a prior patent of which I am a joint inventor, namely Bright and Fisher 2,364,341, and Fisher Patent 2,341,433, it has been pointed out that in industry there are obtained certain solvent mixtures. In order to render such solvents reutilizable, it is necessary to carry out separation procedures on the mixtures in order to separate the solvent fraction desired for reuse. Such prior patents describe ways of separating solvent mixtures and control procedures and apparatus that may be used in these processes. Other processes for separating mixtures have been described in the art.

The prior art processes in many instances have not provided as complete a separation of some of the fractions as is desired. Hence, it is apparent that the development of an improved distillation process and apparatus for separating solvent mixtures represents a highly desirable result. After a substantial investigation I have discovered a distillation procedure involving by-passing of reflux or vapor whereby more distinct fractions may be obtained in the distillation of solvent mixtures.

This invention has for one object to provide a method of distilling a solvent mixture containing several solvents. More particularly this invention concerns an improved method of distilling solvent mixtures containing halogenated hydrocarbons, cyclic hydrocarbons and alcohols. Still another object is to provide a distillation process of the present invention which involves azeotropic distillation. Still another object is to provide a method of distillation wherein a better separation is accomplished with respect to certain fractions withdrawn from the side of the distillation. A particular object is to provide a distillation method wherein there is by-passing of reflux or vapors at a certain point in the process. Still another object is to provide an apparatus arrangement suitable for carrying out the aforementioned process operations. Other objects will appear hereinafter.

In the continuous fractionation of multi-component mixtures, it is well known in the art to withdraw from an intermediate point in a distilling column a liquid or vapor stream containing in relatively high concentration a component intermediate in volatility between the top and bottom products of the column. These side stream withdrawals have been substantially contaminated with other components of the mixture, the degree of contamination depending to some extent on the design and operation of the equipment as well as the characteristics of the mixture undergoing distillation.

In the broader aspects of the present invention I have found a method whereby the concentration of the undesired component in such a side stream withdrawal is significantly decreased.

My new process includes the significant feature of by-passing a portion of the reflux passing down through the distilling column or vapor passing up through the distilling column around a section of the column within which a side product is being withdrawn.

For assistance in an understanding of the present invention reference is made to the attached drawing forming a part of this application. In the attached drawing FIG. 1 discloses a semi-diagrammatic side elevation view of a distillation unit provided with by-pass facilities for carrying out the present invention.

Referring to this figure, there is disclosed in detail a distillation column 1. This distillation column may be of any known construction such as packed or bubble plate column, the latter being preferred. Such distillation column would be equivalent to a plate column of 50–100 plates. The column is provided with a feed inlet 2 in the upper part of the column as will be described in more detail in connection with certain of the examples. Also, the upper part of the distillation column is provided with a vapor off-take conduit 3 of ample size to permit the vapors to rise from the top of the column without undue pressure. This conduit 3 leads to conventional condenser construction 5. Such condenser construction may be a tube bundle in which the tubes are cooled by water or other coolant. Since condenser constructions are well known, extended description thereof appears to be unnecessary.

The condenser is provided with conduit 6 for the draw-off of condensate, part of which condensate may be returned through conduit 7 to the top of the column as reflux. Another part may be withdrawn through conduit 8 for further treatment or use.

The lower part of column 1 is provided with a still pot calandria or reboiler 11. This reboiler would be heated in any suitable manner such as by coils therein (not shown). The upper part of the reboiler is connected to the bottom of the column by means of conduit 12 which is of adequate size to conduct the hot vapors into the base of the column. The lower part of the column is also connected to the reboiler by conduit 13 which is adapted to permit the liquid from the base of column 1 which it is desired to reheat to flow into the boiler. The base of the reboiler is provided with a conduit 15 from which a separated fraction may be withdrawn.

Referring now to the intermediate section of column 1, at some point, preferably below the feed inlet, there is provided an inlet conduit 14 for the introduction of water into the column. A still additional inlet conduit for water is provided at 16.

Also, intermediate of the column is provided a conduit 17 for the draw-off of fractionated product. In close proximity to the intermediate section of the column where this product drawoff is provided and in accordance with the present invention, there is provided a by-pass construction. This by-pass construction is comprised of the conduit 18 which is provided with a valve 19 and the further conduit 20 which leads back into the column at some intermediate point below the product draw-off 17. In the event the by-pass is to be used for by-passing liquid, then conduits 18 and 20 are positioned in the side of the column so that they enter the column below the liquid level of the liquid on the standard bubble plates. In the event the by-pass is to be used for by-passing vapor, then the point of entry of conduits 18 and 20 would be somewhat higher on a bubble plate section so that the conduit would be above the liquid level on the bubble plates. Also, the vapor by-pass may be located above the feed as will be noted when considering FIG. 3.

In addition to the various parts described, the column may be equipped with automatic controls, pumps and the like items disclosed to a substantial extent in the patents referred to above. Likewise, the columns may be equipped with thermometers or other temperature measuring devices and the like, but since such items form no part of the present invention, extended discussion thereof appears to be unnecessary.

The operation of the apparatus just described is thought to be apparent to a substantial extent from the legends appearing on the drawing. However, brief description thereof will be set forth. The solvent mixture to be fractionated is fed into the column at an intermediate section through conduit 2. Water is also introduced at intermediate sections 14 and 16. Heat is supplied to the reboiler 11 so that the more volatile components of the solvent mixture tend to pass up through the column and the high boiling components and water extractable components pass down through the column due to the introduction of water. Because of the formation of certain azeotropes in the solvent mixture, which azeotropes have lower boiling points than the components thereof, the lowest boiling azeotropes passes out of the upper part of the column and is condensed in condenser 5, part of the condensate is returned to the column as reflux and the remainder withdrawn for use or passed to further distillation for separation of the azeotrope composition. At some intermediate point in the column, as out of conduit 17, there is withdrawn from the side of the column a certain solvent fraction which it is desired to isolate. In accordance with the present invention, in close proximity to this withdrawal of side fraction, a part of the liquid reflux or vapor reflux is by-passed through conduits 18 and 20. By such procedure I have found that the fraction withdrawn at the side may be rendered more distinct and free of undesired components.

A further understanding of my invention will be had from a consideration of the following examples which are set forth to illustrate certain preferred embodiments.

*Example I*

In this example, which may be better understood by referring to the drawing, a solvent mixture of ethylene dichloride, propylene dichloride, cyclohexane, n-butanol and acetone is fed to the 56th plate A of a 75 plate distilling column, B. To the 4th C and 40th D plates of the column are fed streams of water. From the draw-off E at the top of the colmun there is removed a product containing substantially all of the cyclohexane and acetone in the feed, along with a small amount of water. This separation is effected because of the existence of a ternary azeotrope containing these three components.

From the reboiler F, there is withdrawn a two-phase bottom product at G, containing most of the n-butanol and water introduced into the column.

From an intermediate point in the column H which may, for example be the 28th plate, there is withdrawn a fraction comprised of the halogenated hydrocarbons. This withdrawal point is selected at the maximum concentration of ethylene plus propylene chlorides. Alternatively, if desired, this intermediate product could be withdrawn as vapor.

With the column operating as described above, draw-off fraction H contains about 15% n-butanol. Therefore, it would require some further treatment to separate the mixture into its components or to eliminate the butanol content.

In accordance with the present invention a portion of the column reflux is withdrawn from a point I, four plates above H, through valve J and conduit K and returned to column B at point L, four plates below H. This causes the concentration of n-butanol in the product from H to decrease from about 15% to about 6%. In the particular example shown, the proportion of reflux by-passed to total reflux was moderate. In general the optimum withdrawal and return plates and the proportion of reflux by-passed may be determined by opening valve J various amounts until the desired operation is obtained.

FIG. 2 is a semi-digrammatic side elevation view substantially similar to FIG. 1; hence, extended description thereof is unnecessary. It is sufficient to indicate that a consideration of the following Example II will explain this figure.

*Example II*

In accordance with this example, a distilling column similar to that employed in Example I was utilized but of a somewhat smaller size than the column of Example I. That is, the column used in this example contained 54 plates as contrasted to the column in Example I which had 75 plates. The solvent mixture treated in this example was of a different composition and comprised the following: acetone, methanol, propylene dichloride, isopropanol and n-butanol.

Referring to FIG. 2, the above mixture was fed to the 31st plate A of a 54 plate column. From the draw-off B at the top of the column, all of the acetone and methanol are removed, along with a small proportion of the propylene dichloride in the feed.

From the 21st plate C, there is withdrawn a product containing substantially all of the isopropanol in the feed. This is withdrawn as a mixture containing about an equal amount of propylene chloride, along with a much smaller quantity of n-butanol. The presence of such a mixture at this point in the column is due to the existence of a binary azeotrope between isopropanol and propylene dichloride containing about 48% propylene dichloride.

From the reboiler D, there is withdrawn a mixture containing the remainder of the propylene dichloride and n-butanol in the feed.

With the column operating as described above, product C contains about 1% n-butanol. This concentration of n-butanol is objectionable for re-use of this product.

In accordance with the present invention, a portion of the reflux is withdrawn from a point F, two plates above C, through valve H and conduit E and returned to the column at point G, four plates below C. This caused the concentration of n-butanol in the product from C to decrease from about 1% to about 0.4%. In this example, about 30% of the column downflow at this point was by-passed.

FIG. 3 is similar to the preceding figures excepting that there is no reboiler. Steam is introduced into the bottom of the column through conduit 31. Contents from the bottom are withdrawn through conduit 32. FIG. 3 will be understood by considering the following example.

*Example III*

In accordance with this example, a mixture of methanol, ethanol, n-butanol and water was fed to the 34th plate A of an 84 plate distilling column C as shown in FIG. 3.

From the top draw-off B, substantially all of methanol contained in the feed is withdrawn as a product.

In the lower portion of the column, fractional distillation produces a two-phase mixture of n-butanol and water. From the 8th plate D substantially all of the n-butanol in the feed is removed by means of an internal decanter built into the column.

From the base of the column E there is removed all of the water in the feed A as well as that resulting from the condensation of low pressure steam which is used as the source of heat for this column.

Due to the relative volatility of solvents in the column, the ethanol present in the feed tends to concentrate at the 61st plate of the column. At this point F, there is withdrawn a sidestream containing substantially all of the ethanol present in the feed along with significant amounts of methanol and water.

With the column operating as described above, draw-off fraction F contains about 23% ethanol.

In accordance with the present invention, a portion of the column vapor is withdrawn from a point G, nine plates below F, through valve H and conduit I and returned to column C at point J six plates above F. This caused the concentration of ethanol in the draw-off fraction F to increase from about 23% to about 45%.

In many cases, a sidestream may be similarly withdrawn from a distilling column at a point between the feed and the top of the column. By analogy, my invention would include the bypassing of a portion of the vapor passing up the column around the point of withdrawal of such a sidestream.

The amount of by-pass either liquid or vapor may be varied dependent on the length of column, the particular mixture being distilled and the like factors. In general I prefer to determine the desired amount of by-pass by trial in any particular column. That is, the valve 19 may be opened only a small amount as even a small amount of by-pass will improve the process. By opening the valve in steps and analyzing the side fraction, the desired amount of by-pass for any particular distillation may be readily ascertained. In general the amount of by-pass of liquid or vapor would not exceed 50% of the reflux liquid flowing down the column or a comparable proportion of the vapor.

As shown in the attached drawings, the by-pass is usually located in close proximity to the plate where the side draw-off is made. In general, from 2–10 plates adjacent the side draw-off is a satisfactory location for the by-pass of the present invention.

Certain variations in the equipment shown in the drawings will be obvious to those skilled in the art without departing from the spirit of my invention. For example, the operation of the column may be automatically controlled in various ways. In lieu of a reboiler, the column could be operated with live steam introduced at the base of the column. A packed column could be used in place of a plate column.

The invention has been described in detail with particular reference to preferred embodiments thereof, but it will be understood that variations and modifications can be effected within the spirit and scope of the invention as described hereinabove and as defined in the appended claims.

I claim:
1. The process of separating a solvent mixture comprised of ethylene dichloride, propylene dichloride, cyclohexane, acetone and n-butanol which comprises feeding a solvent mixture into an intermediate section of a distillation column having at least 50 plates, also feeding water into the column at an intermediate section below the point of introduction of the solvent mixture, supplying heat to the lower part of the column whereby a fraction comprised of cyclohexane, acetone and water is distilled off the top of the column, condensing this fraction and returning a portion of the condensate to the column as reflux, withdrawing a fraction from the side of the column, said fraction being comprised essentially of ethylene dichloride and propylene dichloride and in the vicinity of this side withdrawal by-passing a part of the column contents around the plate section where the side fraction is withdrawn whereby the amount of butanol contamination in the side fraction is reduced.

2. A process in accordance with claim 1 wherein the by-pass is positioned within 2–10 plates of the side withdrawal.

References Cited in the file of this patent

UNITED STATES PATENTS

| | | |
|---|---|---|
| 2,341,433 | Fisher | Feb. 8, 1944 |
| 2,364,341 | Bright et al. | Dec. 5, 1944 |
| 2,468,514 | Rider et al. | Apr. 26, 1949 |
| 2,520,006 | Hibshman et al. | Apr. 22, 1950 |
| 2,729,600 | Beach | Jan. 3, 1956 |